United States Patent [19]
Brunson et al.

[11] Patent Number: 5,512,251
[45] Date of Patent: Apr. 30, 1996

[54] COMBINED ELECTRICALLY HEATABLE CONVERTER BODY

[75] Inventors: Gordon W. Brunson, Chagrin Falls; William A. Whittenberger, Leavittsburg, both of Ohio

[73] Assignee: W. R. Grace & Co.-Conn., New York, N.Y.

[21] Appl. No.: 282,715

[22] Filed: Jul. 29, 1994

[51] Int. Cl.⁶ .............................. F01N 3/10; B01D 53/34
[52] U.S. Cl. .................. 422/174; 422/179; 422/180; 422/199; 422/221; 422/222; 60/299; 60/300; 502/439; 502/527
[58] Field of Search ................................ 422/174, 179, 422/180, 199, 221, 222; 502/439, 527; 60/300, 299; 55/DIG. 30

[56] References Cited

U.S. PATENT DOCUMENTS

| | | | |
|---|---|---|---|
| 4,152,302 | 5/1979 | Nonnenmann et al. | 502/527 |
| 4,845,073 | 7/1989 | Cyron | 502/527 |
| 4,886,711 | 12/1989 | Foldvary | 502/527 |
| 5,051,294 | 9/1991 | Lunkas et al. | 502/527 |
| 5,068,218 | 11/1991 | Nishizawa | 502/527 |
| 5,149,508 | 9/1992 | Bullock | 422/174 |
| 5,170,624 | 12/1992 | Cornelison et al. | 60/300 |
| 5,187,142 | 2/1993 | Richmond et al. | 502/439 |
| 5,232,671 | 8/1993 | Brunson et al. | 422/180 |

*Primary Examiner*—Robert J. Warden
*Assistant Examiner*—Hien Tran
*Attorney, Agent, or Firm*—Beverly J. Artale

[57] ABSTRACT

There is provided an improved converter body core element having a corrugated thin metal strip having, parallel to and close to a longitudinal marginal edge thereof, a recess dimensioned and configured to receive a heater band. In specific embodiments, the heater band is desirably lightly corrugated, i.e., having an amplitude of the corrugations which is from one tenth to one third the amplitude of the corrugations in the strip containing the recess, and the heater band is dimensioned and configured to fit into the recess.

12 Claims, 6 Drawing Sheets

COMBINED ELECTRICALLY HEATABLE CONVERTER BODY

This invention relates to a converter body, and more particularly to a converter body wherein a portion thereof is electrically heatable. The remaining portion is a non-electrically heatable "light-off" portion integral with the electrically heatable portion as will be described below. The converter body is characterized by a cellular metal honeycomb desirably formed of thin metal layers or strips which are contained in a retaining shell. The combination of the metal honeycomb and the retaining shell forms a core which may then be placed in a housing. In one embodiment, the housing is adapted to be inserted in an exhaust line extending from an internal combustion engine, for example, to aid in the removal of pollutants contained therein.

The devices hereof are improved in the provision of a novel terminal bus and retainer for the converter body.

RELATED APPLICATION

This application is related to copending application Ser. No. 08/282,716 filed 29 Jul. 1994.

BACKGROUND OF THE INVENTION AND PRIOR ART

This invention will be described in connection with embodiments especially adapted for use in exhaust lines from various types of engines, e.g., internal combustion engines of the spark ignited or compression ignited types, stationary or mobile, or gas turbine engines. It will be understood, however, that the converters of the present invention may be used to effect various chemical reactions, particularly those occurring in fluid streams, especially gas streams, which reactions are catalyzed or uncatalyzed.

Turning now to converters especially useful in exhaust lines extending from internal combustion engines, e.g., those used in automotive vehicles, the purpose of such catalytic converters is to convert pollutant materials present in the exhaust stream, e.g., carbon monoxide, unburned hydrocarbons, nitrogen oxides, etc., to carbon dioxide, nitrogen and water prior to discharge into the atmosphere. Conventional automotive catalytic converters utilize an oval or circular cross-section ceramic honeycomb monolith having square or triangular straight-through openings or cells with catalyst deposited on the walls of the cells; catalyst coated refractory metal oxide beads or pellets, e.g., alumina beads; or corrugated thin metal foil multicelled honeycomb monolith, e.g., a ferritic stainless steel foil honeycomb monolith, having a refractory metal oxide coating and catalyst carried on said coating and supported on the surfaces of the cells. The catalyst is normally a noble metal, e.g., platinum, palladium, rhodium, ruthenium, or a mixture of two or more of such metals. Zeolite coatings may also be used for the adsorption and desorption of pollutants to aid in their removal. The catalyst catalyzes a chemical reaction, mainly oxidation, whereby the pollutant is converted to a harmless by-product which passes through the exhaust system to the atmosphere.

However, conversion to such harmless by-products is not efficient initially when the exhaust gases are relatively cold, e.g., at cold engine start. To be effective at a high conversion rate, the catalyst and the surface of the converter which the exhaust gases contact must be at or above a minimum temperature, e.g., 390 degrees F. for carbon monoxide, 570 degrees F. for volatile organic compounds, and about 900 degrees F. for methane or natural gas. Otherwise conversion to harmless by-products is poor and cold start pollution of the atmosphere is high. It has been estimated that as much as 80% of the atmospheric pollution caused by vehicles, even though equipped with conventional non-electrically heated catalytic converters, occurs in the first two minutes of operation of the engine from cold start. Once the exhaust system has reached its normal operating temperature, a non-electrically heated catalytic converter is optimally effective. Hence, it is necessary for the relatively cold exhaust gases to make contact with hot catalyst so as to effect satisfactory conversion. Compression ignited engines, spark ignited engines, reactors in gas turbines, small bore engines such as used in lawn mowers, trimmers, boat engines, and the like have this need.

To achieve initial heating of the catalyst at engine start-up, there is conveniently provided an electrically heatable catalytic converter unit, preferably one formed of a thin metal honeycomb monolith. This monolith may be formed of spaced flat thin metal strips, straight-through corrugated thin metal strips, pattern corrugated thin metal strips, e.g., herringbone or chevron corrugated thin metal strips, or variable pitch corrugated thin metal strips (such as disclosed in U.S. Pat. No. 4,810,588 dated 7 Mar. 1989 to Bullock et al) or a combination thereof, which monolith is connected to a 12 volt to 108 volt or higher, AC or DC supply, single or multi-phase, preferably at the time of engine start-up and afterwards to elevate the catalyst to and maintain the catalyst at at least 650 degrees F. plus or minus 30 degrees F. Alternatively, power may also be supplied for a few seconds prior to engine start-up.

Catalytic converters containing a corrugated thin metal (stainless steel) monolith have been known since at least the early 1970's. See Kitzner U.S. Pat. Nos. 3,768,982 and 3,770,389 each dated 30 October 1973. More recently, corrugated thin metal monoliths have been disclosed in U.S. Pat. No. 4,711,009 dated 8 Dec. 1987 to Cornelison et al; U.S. Pat. Nos. 4,152,302 dated 1 May 1979, 4,273,681 dated 16 Jun. 1981, 4,282,186 dated 4 Aug. 1981, 4,381,590 dated 3 May 1983, 4,400,860 dated 30 Aug. 1983, 4,519,120 dated 28 May 1985, 4,521,947 dated 11 Jun. 1985, 4,647,435 dated 3 Mar. 1987, 4,665,051 dated 12 May 1987 all to Nonnenmann alone or with another; U.S. Pat. No. 5,070,694 dated 10 Dec. 1991 to Whittenberger; International PCT Publication Numbers WO 89/10470 (EP 412,086) and WO 89/10471 (EP 412,103) each filed 2 Nov. 1989, claiming a priority date of 25 Apr. 1988. The above International Publication Numbers disclose methods and apparatus for increasing the internal resistance of the device by placing spaced discs in series, or electrically insulating intermediate layers. Another International PCT Publication is WO 90/12951 published 9 Apr. 1990 and claiming a priority date of 21 Apr. 1989, which seeks to improve axial strength by form locking layers of insulated plates. Another reference which seeks to improve axial strength is U.S. Pat. No. 5,055,275 dated 8 Oct. 1991 to Kannainian et al. Reference may also be had to PCT Publication Number WO 92/13636 filed 29 Jan. 1992 claiming a priority date of 31 Jan. 1991. This application relates to a honeycomb body along an axis of which fluid can flow through a plurality of channels. The honeycomb has at least two discs in spaced relation to each other. According to the specification, there is at least one bar type support near the axis by which the discs are connected together and mutually supported. The invention is said to make possible design of the first disc for fast heating up through exhaust gas passing through or applied electrical current. The honeycomb body serves as a bearer for catalyst in the exhaust system of an internal combustion engine.

Another reference is German Patent Application Number 4,102,890 A1 filed 31 Jan. 1991 and published 6 Aug. 1992. This application discloses a spirally wound corrugated and flat strip combination wherein the flat strip contains slots and perforations and is electrically heatable. The flat strips include a bridge between leading and trailing portions. Groups of such strips are separated by insulation means. The core is provided with a pair of circular retainer segments which are separated by insulation means. No end tabs are provided, and the flat strip portions are unitary. Another reference is U.S. Pat. No. 5,102,743 dated 7 Apr. 1992. This patent discloses a honeycomb catalyst carrier body of round, oval or elliptical cross section including a jacket tube and a stack of at least partially structured sheet-metal layers intertwined in different directions in the jacket tube. The stack has a given length and a given width. At least one of the sheet metal layers has a greater thickness over at least part of one of the dimensions than others of the layers. Such at least one layer is formed of thicker metal or of a plurality of identically structured metal sheets in contiguous relation.

Still another reference is the patent to Maus et al 5,146,743 dated 15 Sep. 1992 which discloses a system including a main catalyst and an electrically heatable pre-catalyst disposed upstream of the main catalyst.

A common problem with prior devices has been their inability to survive severe automotive industry durability tests which are known as the Hot Shake Test and the Hot Cycling Test.

The Hot Shake test involves oscillating (100 to 200 Hertz and 28 to 60 G inertial loading) the device in a vertical attitude at a high temperature (between 800 and 1100 degrees C.; 1472 to 2012 degrees F., respectively) with exhaust gas from a running internal combustion engine simultaneously passing through the device. If the catalytic device telescopes or displays separation or folding over of the leading or upstream edges of the foil leaves up to a predetermined time, e.g., 5 to 200 hours, the device is said to fail the test. Usually a device that lasts 5 hours will last 200 hours. Five hours is equivalent to 1.8 million cycles at 100 Hertz.

The Hot Cycling Test with exhaust flowing at 800 to 1100 degree C.; 1472 to 2012 degrees F.) and cycled to 120 to 150 degrees C. once every 15 to 20 minutes, for 300 hours. Telescoping or separation of the leading edges of the thin metal foil strips is considered a failure.

The Hot Shake Test and the Hot Cycling Test are hereinafter called "Hot Tests" and have proved very difficult to survive. Many efforts to provide a successful device have been either too costly or ineffective for a variety of reasons.

The structures of the present invention will survive these Hot Tests.

Early embodiments of electrically heatable catalytic converters were relatively large, especially in an axial direction, e.g., 7 to 10 or more inches long and up to 4.5 inches in diameter. These were inserted into an exhaust system either as a replacement for the conventional catalytic converter now in common use, or in tandem relation with such conventional catalytic converter in the exhaust line. It was then found that an axially relatively thin, or "pancake" electrically heated corrugated thin metal honeycomb monolith could be used in close tandem relation with the conventional catalytic converter.

It was later found that even better performance resulted from a "cascade" of converters, i.e., a low thermal inertia electrically heatable converter (EHC), followed by a medium thermal inertia converter, followed by a large thermal inertia main converter, all on generally the same axis of gas flow. Each converter had not only a different thermal inertia, but also a different geometrical cross-sectional area, or a different geometrical configuration, e.g., small circular, larger oval, to the final oval size and shape of a conventional unheated converter. This solution provided for fast, economical heating of the EHC. Heat generated from an oxidation reaction initiated in the EHC then heated the intermediate converter which in turn heated the large converter.

It should be noted that the electrically heatable honeycomb acts to preheat the exhaust gas to its "light-off" temperature where, in the presence of catalyst the pollutants are converted. Some conversion occurs in the electrically heatable device, and most of the conversion occurs in the final catalytic converter section which is normally not electrically heated.

It has been found that a "pancake" electrically heatable device and a conventional multicellular metal monolith catalytic converter may be positioned together within a common housing to take advantage of the common diameter and or geometric configuration (e.g., circular, oval or elliptical) in a cascading device, and having a shorter axial length than required in either the tandem relation or the prior cascade relation. These devices provide three units of differing thermal inertia. However, instead of a three structural member cascade device, the improved structure enabled a two member cascade device. Reference may be had to the copending, commonly owned, patent application of William A. Whittenberger and Edward T. Woodruff entitled "Core Element Useful in a Combined Electrically Heatable and Light-Off Converter" filed 3 Feb. 1993 and given Ser. No. 08/013,516. A still further advantage of the improved "cascade" device is that it facilitates manufacture from thin metal strips to form both the electrically heatable portion and the conventional metal monolith portion, or "light-off" portion, for encasing in a single housing. The devices of the present invention include improvements on the foregoing "cascade" devices. The dual purpose devices hereof may be backed up with a conventional catalytic converter of, for example, the commonly used ceramic type, the alumina pellet type, or the metal monolith honeycomb type mentioned above. Thus, the advantages of the cascade effect for successive light-off may be utilized without encountering a number of the problems associated therewith. Avoiding substantial electrical heating of a major portion of the thin metal honeycomb effects a major saving in electrical power required. As will become evident in the present structures, even further reduction in power requirements can be effected. The even smaller thermal mass of the hybrid "pancake" EHC portion of the present devices and the resulting exotherm further heats the exhaust gas and the subsequent "light-off" converter to effect substantial completion of the oxidation of pollutant materials in the presence of a catalytic agent or agents. The devices hereof may be thought of as "integral" in that at least some, but not all, of the thin sheet metal layers extend the entire axial length of the converter body, and the remainder are split or divided into an electrically heatable portion and an unheated portion to make up the axial length of the converter body. Unlike the improved cascade devices described in the aforesaid application Ser. No. 08/013,516 wherein the electrically heatable "pancake" portion is physically separated from the "light-off" portion, those thin sheet metal layers or strips that are split in the devices hereof, are nevertheless in contiguous relation with adjacent fully axially extending thin metal layers or strips.

In the following description, reference will be made to "ferritic" stainless steel. A suitable ferritic stainless steel for use particularly in the engine exhaust applications hereof, is described in U.S. Pat. No. 4,414,023 dated 8 Nov. 1983 to Aggen. A specific ferritic stainless steel alloy useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV." Another metal alloy especially useful herein is identified as Haynes 214 alloy which is commercially available. This alloy and other nickeliferous alloys are described in U.S. Pat. No. 4,671,931 dated 9 Jun. 1987 to Herchenroeder et al. These alloys are chacterized by high resistance to oxidation. A specific example contains 75% nickel, 16% chromium, 4.5% aluminum, 3% iron, optionally trace amounts of one or more rare earth metals except yttrium, 0.05% carbon and steel making impurities. Haynes 230 alloy, also useful herein, has a composition containing 22% chromium, 14% tungsten, 2% molybdenum, 0.10% carbon, and a trace amount of lanthanum, balance nickel. The ferritic stainless steels and the Haynes alloys 214 and 230 are examples of high temperature resistive, oxidation resistant (or corrosion resistant) metal alloys that are suitable for use in making thin metal strips for use in the converter bodies hereof, and particularly for making heater strips for the EHC portions and "light-off" portions hereof. Suitable metal must be able to withstand "high" temperatures of 900 degrees C. to 1200 degrees C. (1652 degrees F. to 2012 degrees F.) over prolonged periods.

Other high temperature resistive, oxidation resistant metals are known and may be used herein. For most applications, and particularly automotive applications, these alloys are used as "thin" metal strips, that is, having a thickness of from about 0.001" to about 0.005", and preferably from 0.0015" to about 0.003".

In the following description, reference will also be made to fibrous ceramic mat, woven ceramic tape, or fabrics, or insulation. Reference may be had to U.S. Pat. No. 3,795,524 dated 5 Mar. 1974 to Sowman, and to U.S. Pat. No. 3,916,057 dated 28 Oct. 1975 to Hatch, for formulations and manufacture of fibers useful in making tapes and mats useful herein. One such woven ceramic fiber material is currently available from 3-M under the registered trademark "NEXTEL" 312 Woven Tape and is useful for insulation of thin metal strips or groups thereof. Ceramic fiber mat is commercially available under the trademark "INTERAM" also from 3-M. For most purposes, a coating insulation layer of alumina, for example, is preferred.

BRIEF STATEMENT OF THE INVENTION

Briefly stated, the present invention is an improved core element for the electrically heatable portion of a combined electrically heatable converter and light-off converter. In more specific embodiments of the invention, the core element is an electrically heatable band and a specially corrugated layer. The corrugated thin metal strip or layer comprises an elongated thin metal strip having parallel marginal edges, and a plurality of wave form corrugations extending between the marginal edges. The peaks of the wave-form corrugations along at least one edge of the thin metal strip for at least a portion of the distance between the marginal edges are deformed in a direction toward the opposite peak, (or the opposite side of the thin metal strip), to form a recess of predetermined width less than the width of the elongated thin metal strip, and parallel to the marginal edges of the elongated thin metal strip. The recess is desirably closer to one marginal edge than to the other. Also desirably, recesses are provided on both sides of the corrugated thin metal strip, and still more desirably the recesses are at the same distance from the same marginal edge. To facilitate manufacture, it has also been found desirable to provide a corresponding second recess in one or both surfaces of the thin metal strip adjacent to the opposite marginal edge.

BRIEF DESCRIPTION OF THE DRAWINGS

The invention may be better understood by having reference to the annexed drawings showing a preferred embodiment of the invention, and wherein.

DETAILED DESCRIPTION OF THE INVENTION

As indicated above, the present invention is an improvement in the core elements of the electrically heatable portion of a combined electrically heatable and light-off converter, and more particularly an improvement in the core elements described and shown in copending, commonly owned U.S. application Ser. No. 08/282,716 filed 29 Jul. 1994. The devices described and shown in the latter application and in the present application are "integral" devices meaning that instead of an isolated electrically heatable portion and light-off portion as described in the aforesaid U.S. application Ser. No. 08/013,516, the electrically heatable portion and the light-off portion are engaged with one another at least in part, or "integral" with one another. The electrically heatable portion of the present devices is desirably at the upstream end of the core, and the light-off portion is at the downstream end of the core. A portion of the light-off portion is located in the upstream end of the device.

One process for making the corrugated thin metal layers or strips suitable for use herein is disclosed in U.S. Pat. No. 4,711,009, supra. A particular advantage of the process therein disclosed for corrugating and coating the thin metal strip as a continuous strip, is that the strip may be coated prior to cutting to length and further assembly with a refractory metal oxide coating, e.g., alumina, gamma-alumina, gamma-alumina/ceria, silica, titania/alumina, vanadia, titania/vanadia, titania, titania/ceria, zirconia, etc., or an adsorption/desorption coating, e.g., a zeolite coating, and with a noble metal catalyst as described in that patent. This process may also be used for coating flat thin metal strip by omitting the corrugation step. Other steps may be omitted, e.g., accordion folding, where, for example, the strip is to be precut to a given length for the layer and further treated or handled before assembly. Alternatively, the converter bodies hereof may be fully assembled in the uncoated state, and the coatings of refractory metal oxide and noble metal catalyst applied after assembly by, for example, a dipping and calcining process. Also, the refractory metal oxide coating may be applied in a process such as described in the aforesaid U.S. Pat. No. 4,711,009, and the catalyst, where one is used, after-applied by a dipping process and a calcining step. In most cases, the coating on all the layers will be essentially the same. It should be noted, however, that different coatings applied to both sides of different layers, and different coatings and/or catalysts on the same layer may be used herein.

The core elements of the converters of the present invention are formed from thin metal strips and structured to provide a multiplicity of cells passing through the converter body. This is conveniently facilitated by corrugating a thin metal strip. The corrugated thin metal strip may be rendered non-nesting by any one of several modes. For present purposes, a combined core element including a corrugated thin metal strip and a flat metal strip in contiguous relation and wound or shaped to provide a core body is preferred. Alternatively, the flat thin metal strip may be omitted and the corrugated thin metal strips used alone and rendered non-nesting by a mode of corrugating as described in the aforesaid Bullock et al U.S. Pat. No. 4,810,588 dated 7 Mar. 1989. In this case, the corrugating mode is to utilize a variable pitch corrugation so that when two such strips are layered together, they do not nest.

Another mode of corrugating is to utilize a patterned corrugation, such as a herringbone pattern or a chevron pattern whereby when two such strips are layered together they do not nest. With such a patterned structure, the back pressure through the device is raised above that obtaining when cells extending straight-through the device is used. In a straight-through device, the cells are normally parallel to the axis of the core body. The cells although straight, may, however, be disposed at an angle to the axis to provide a somewhat longer path.

The thin metal strips, corrugated or not, may be continuous or non-perforated, or they may be perforated with regular holes or, for example, screen.

The preferred structure of the devices hereof is one in which the cells are provided by a regularly corrugated thin metal strip or layer in contiguous relation with a flat thin metal strip or layer, or a flat layer which includes a heater band and a flat band, and a small space between the two flat bands. These strips are layered with corrugated thin metal strips alternating with flat thin metal strips or bands.

The thin metal layers are desirably coated on at least one side, and preferably both sides, with an insulative coating, e.g., a washcoat of a refractory metal oxide to a loading of from 10 to 80 mgs/sq.in. of surface area. The heater bands may be coated with an insulative barrier coating which may be an alumina/phosphate coating, or a "dielectric" coating, or a washcoat of refractory metal oxide.

A very satisfactory and preferred coating system for the metal surfaces of the devices hereof, and particularly the thin metal strips or layers in either or both of the electrically heatable and the light-off portions, involves applying one or more layers of washcoat of gamma-alumina applied by electrophoretic deposition to a loading of from 10 mgs. per square inch up to about 35 mgs. per square inch, followed by drying and calcining at about 1000 degrees C. for up to 30 to 90 minutes, e.g. 60 minutes. The surface is then treated a liquid dilute aqueous solution of phosphoric acid (about 23% by weight concentration) by brush or spray application. The surface is then blotted and dried with an electric dryer, followed by again calcining at about 1000 degrees C. for about 5 minutes. This preferred process is the invention of William B. Retallick.

A typical procedure for applying a "dielectric" coating involves first coating the thin metal strip, whether flat or corrugated, and formed of an aluminum-containing, high temperature resistive, oxidation or corrosion resistant alloy, with a single coat of gamma-alumina at a loading of about 5 mgs per square inch of surface, followed by drying and then calcining at 700 to 1200 degrees C. (1292 to 2192 degrees F.) for at least about 10 seconds, to form a tightly bonded insulative coating. This is typically followed by coating again with 1 to 6 or more washcoatings of gamma-alumina/ceria mixture to a loading of about 30 to 40 mgs. per square inch, drying after each coat, and then calcining at about 500 degrees C. (930 degrees F.). The usual coating with a refractory metal oxide produced at the lower temperature of 500 to 1200 degrees F. also has insulating properties but not to the same degree as the "dielectric" coating. The "dielectric" coating as here described is believed to be a spinel and thus is chemically different from the normal refractory metal oxide coating calcined at the lower temperature.

It will be noted that the corrugated thin metal layers in a preferred case extend axially from one end of the core to the other. Some of the flat thin metal layers extend from end to end. However, others of the flat thin metal layers are composed of two bands, one an electrically heatable band or heater band, which is connected to a voltage source, and the other, a flat band, spaced from the heater band, not electrically connected, and completing the axial dimension of the layer. Thus each corrugated thin metal layer is associated with either a full length flat thin metal layer, or a split flat thin metal layer composed of two bands, one band electrically heated and the other band not electrically heated. The cells generated by the contiguity of the alternating flat and corrugated thin metal layers extend from one end face of the core to the other. It is the interlocking of a part of the light-off portion with the electrically heatable portion that results in the term "integral" being applied to the converter body as a whole.

These devices are "multicellular," that is, they have a plurality of cells axially extending through the converter body, preferably in a straight line path parallel to the axis of the core body. In general, the cell density of the devices of this invention is in the range of from 50 to 700 cells per square inch (cpsi) and desirably from about 150 cpsi to about 400 cpsi.

In general, the corrugations have an amplitude of from about 0.02" to about 0.15" and a pitch of from about 0.02 to about 0.2", and a cross-section in the shape of a triangle with rounded apices to reduce stress. A wave form or sinusoidal corrugation may be used if desired.

The novelty in the present invention is in the structure of the corrugated thin metal strips of layers which are in contact with the heater bands, which heater bands are also desirably, albeit not essentially, slightly corrugated, i.e., having an amplitude less than the amplitude of the corrugated thin metal strips. The corrugations may be at the same or different pitch. The corrugated thin metal layers that are to be in contiguous relation with the thin metal heater bands are provided with a recess dimensioned and configured to act as a seat for the heater band. Desirably, the heater band is very lightly corrugated, i.e, having an amplitude of from about one tenth to about one third of the amplitude of the corrugations in the corrugated thin metal layer, and a pitch of from one tenth to about one third the pitch of the corrugations in the corrugated thin metal layer. This is to enable the heater band to expand and contract in response to thermal changes in the converter body in use.

Figure 1:
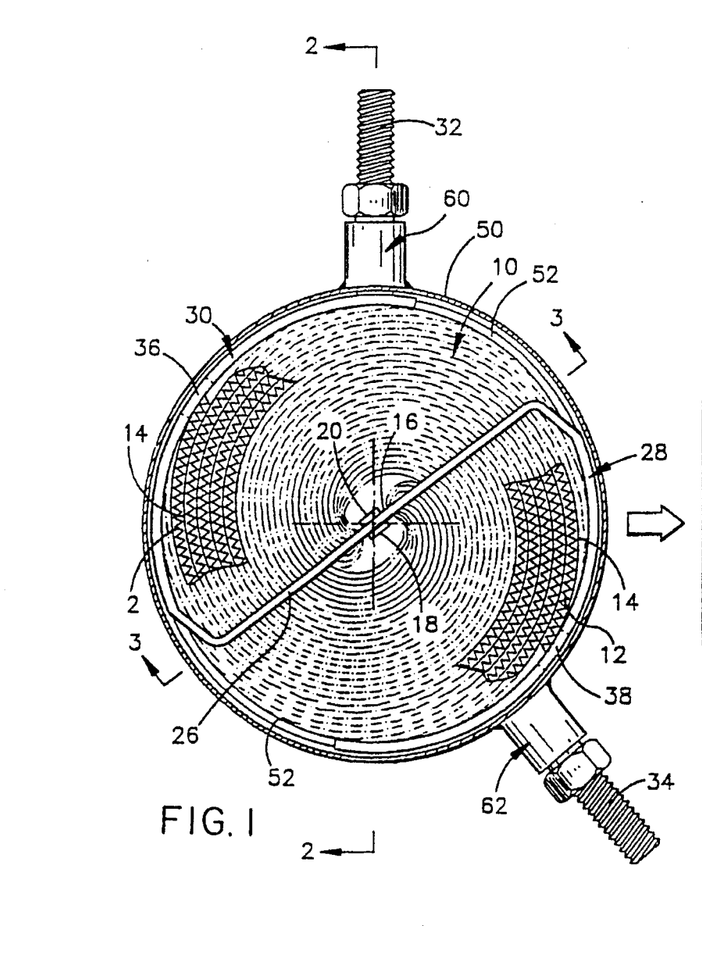
FIG. 1 is an end view taken from the gas inlet end of a multicellular metallic core honeycomb of the converter body of the present invention.
Figure 2:
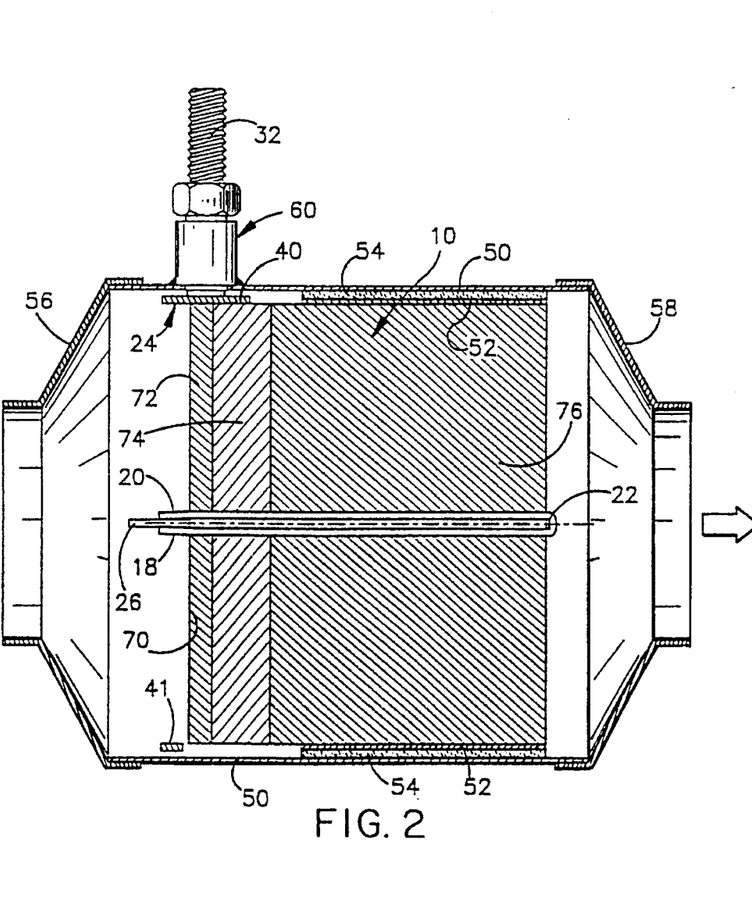
FIG. 2 is a cross-sectional view of the device shown in FIG. 1 as it appears in the plane indicated by the line 2—2 in FIG. 1.
Figure 3:
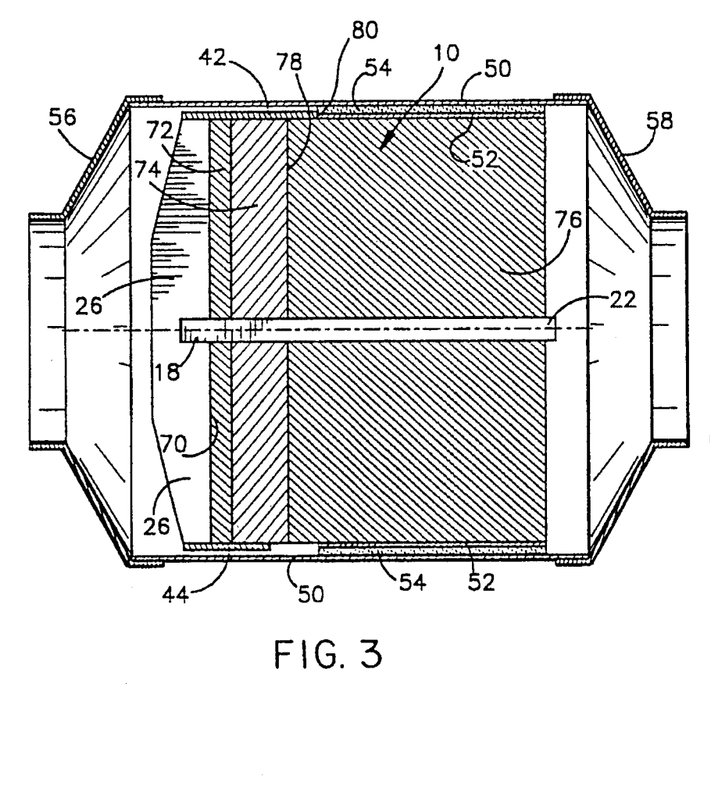
FIG. 3 is a cross-sectional view of the device shown in FIG. 1 as it appears in the plane indicated by the line 3—3 in FIG. 1.

FIG. 1 is an end view of the gas inlet face, or gas inlet end, of a device in accordance herewith. FIGS. 2 and 3 are axial cross-sectional views as the device appears in the planes indicated by the lines 2—2 and 3—3 in FIG. 1. There is shown a multicellular metallic core honeycomb 10 formed of corrugated thin metal layers 12 in contiguous relation with flat thin metal layers 14. The center portions 16 (best shown in FIG. 10) are grasped between the legs 18 and 20 of a U-shaped clip 22 (FIG. 2), and the stack of thin metal layers tightly spirally wound in a spiral by twisting the clip 22 in a clockwise or a counterclockwise manner as shown in FIG. 1. The free ends of the legs 18 and 20 of the clip 22 are secured, as by welding or brazing, to a terminal bus and retainer such as described in commonly owned U.S. patent application Ser. No. 08/282,716 filed 29 Jul. 1994 at the center of a metal crossbar 26 integral with the terminal bus and retainer 24, and extending across the upstream edges of the thin metal layers 12 and 14. The metal crossbar 26 in combination with the U-shaped clip 22 serves to hold the core body 10 stable in the extreme Hot Tests described above.

Figure 4:
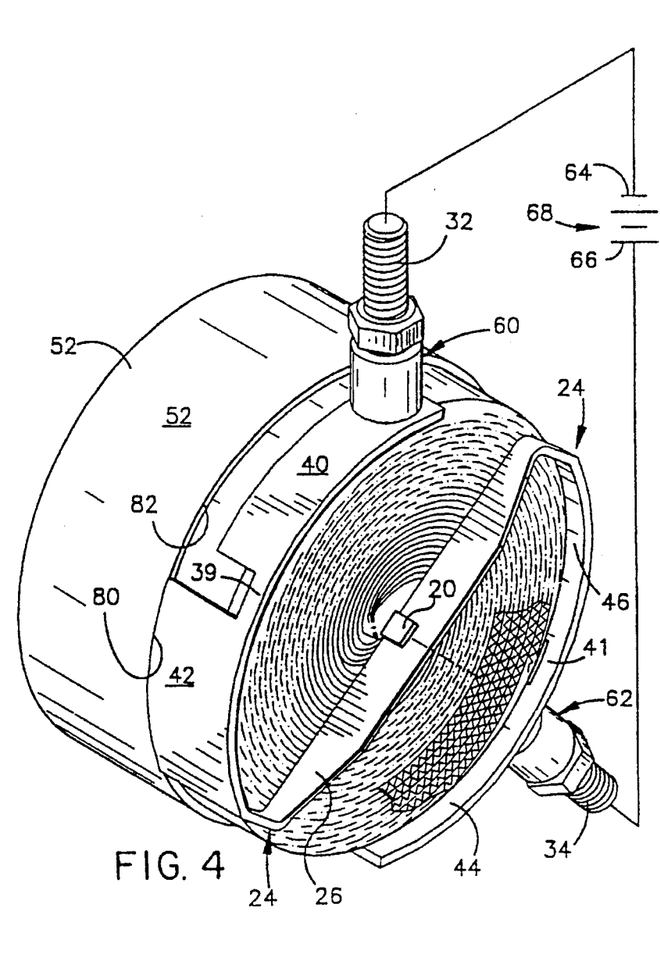
FIG. 4 is a perspective view of the device shown in FIGS. 1–3 with the outer housing removed showing the retainer for the electrically heatable portion and the inner housing for the light-off portion of the converter body hereof.

The terminal bus and retainer, generally indicated at 24, has a pair of arcuate members generally indicated at 28 and 30 that lie on the circular periphery of the core body 10. As will be described later in connection with FIG. 14, the arcuate members 28 and 30 each have two axially extending sectors (not shown in FIG. 1) of different axial length (See FIG. 4), the axially shorter sectors 40 and 44 of these being attached to terminals 32 and 34, respectively, and to one end of heater bands, as hereinafter described; and the axially longer sectors 42 and 46 of these being attached to the opposite ends of heater bands, as hereafter described. The axially longer sectors, e.g., sectors 42 and 46, are dimensioned axially to meet and be joined with the inner tubular housing 52 as by seam welding, for example. Also shown in end view are sectors 36 and 38, better viewed in FIG. 4. These are narrow strips 39 and 41 joining the two axially extending portions 40 and 42, and the axially extending sectors 44 and 46, as best shown in FIG. 4. The narrow strips 39 and 41 are removable after assembly, and are included only for assembly purposes.

Also shown in FIGS. 1 and 2, are an outer tubular housing 50 and an inner tubular housing 52 which are spaced from and out of electrical contact with each other. It is convenient to fill the space with insulation material 54, (FIG. 2) e.g., INTERAM as mentioned above, or FIBERFRAX HD from Carborundum Co. In order to adapt the converter body 10 for insertion in an automobile exhaust system, there are provided end cap adaptors 56 and 58 suitably secured, as by welding or brazing, to the outer housing 50.

The terminals 32 and 34 extend through the outer housing 50 through an insulated feed-through generally indicated at 60 and 62. For details of a suitable insulated feed-through, reference may be had to commonly owned, co-pending application Ser. No. 07/931,313 filed 17 Aug. 1992 by Sheller et al. Terminal 32 is stud welded, for example, to the sector 40 of the terminal bus and retainer 24 and is, in turn, connected to one pole 64 of a voltage source generally indicated at 68 in FIG. 4. The opposite terminal 34 is stud welded, for example, to the portion 44 of the terminal bus and retainer generally indicated at 24 (FIG. 4) and is, in turn, connected to the other pole 66 of a voltage source 68. In an automotive vehicle, the voltage source is normally a 12 volt or 24 volt lead-acid battery. Higher voltages may be used, and may be AC or DC, single or multiphase up to 120 volts or higher.

As indicated in FIGS. 2 and 3, the gas contacting the inlet face 70 first encounters the heater bands (FIG. 9) lying in the region 72 where its temperature is raised to light-off temperature. The gas then passes into a region 74 which is the region of overlapping between the thin metal layers of the light-off region 76 and the thin metal layers of the electrically heatable region 74. The regions 72 and 74 together constitute the electrically heatable zone, and the zone or region 76 is the light-off portion of the converter body 10. The two zones are "integral" in the region 74.

Referring now to FIGS. 3 and 4, it will be observed that the axial extent of the of the sector 42 of the terminal bus and retainer 24 spans the division line 78 between the electrically heatable portion 72–74 of the converter body 10 and the light-off portion 76. The downstream edge 80 of the terminal bus and retainer 24 abuts the upstream edge of the inner housing 52, and may desirably be seam welded thereto. It will be seen, therefore, that there is provided in the order of gas passage through the device, a directly electrically heatable zone 72 having a given thermal inertia, an intermediate indirectly electrically heatable zone 74 having a larger thermal inertia, and a light-off zone 76 having a still larger thermal inertia. These three elements of a "cascade" device are present albeit of the same diameter and in a single housing. This greatly simplifies the structure of a "cascade" installation while preserving the advantages thereof.

The thin metal layers, both flat and corrugated, are desirably coated on at least one side, and preferably both sides, with a washcoat of a refractory metal oxide to a loading of from 10 to 80 mg/sq. in of surface area. The refractory metal oxide may be alumina, alumina/ceria. titania, titania/ceria, titania/alumina, zirconia, silica, etc., such as those mentioned above. It is tightly adhered to the metal surface. Desirably, a noble metal catalyst, e.g., platinum, palladium, rhodium, ruthenium, indium, or mixtures of two or more of such metals is deposited on the surface of the refractory metal oxide. The heater bands (See FIG. 9) are desirably coated with an alumina/phosphate coating as described above, or they may be coated with a barrier coating which may be a "dielectric" coating.

A procedure for applying a "dielectric" coating is described above. This is typically followed by from 1 to 6 or more coatings of gamma-alumina/ceria slurry, or washcoat, to a total loading of about 30 to 40 mgs/sq. in., drying after each coat and then calcining at about 500 degrees C. (930 degrees F.). The usual coating with a refractory metal oxide produced at a lower temperature of 500 to 1200 degrees F. also has insulating properties, but not to the same degree as the "dielectric" coating. The "dielectric" coating is believed to be a spinel, or a complex refractory metal oxide, and thus is chemically different from the normal refractory metal oxide coating calcined at a lower temperature. To coat thicker parts, such as housings, retaining rings, etc., plasma spraying of gamma-alumina may be used. High temperature calcining may be used in this case, if desired, to form a "dielectric" coating on such parts. The alumina/phosphate coating described above is, however, preferred.

Figure 5:
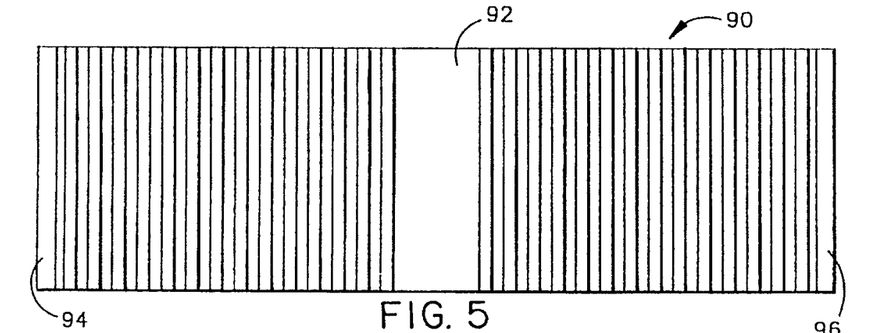
FIG. 5 is a plan view of a regular corrugated thin metal strip for a converter body in accordance herewith.
Figures 6, 7:
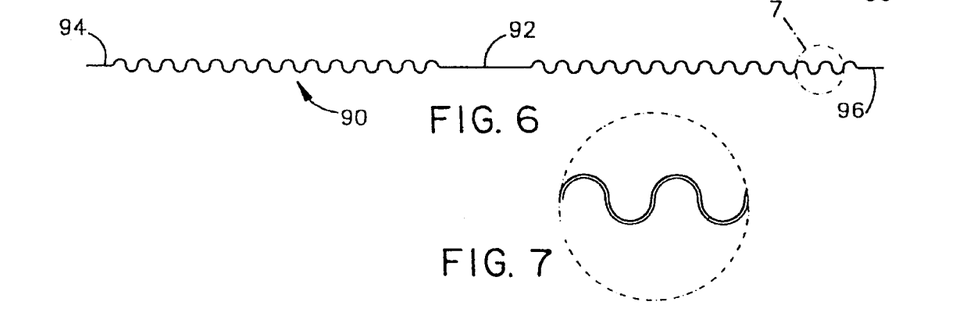
FIG. 6 is a edge view of the corrugated thin metal strip of FIG. 5.
FIG. 7 is a view on an enlarged scale of a portion of the corrugated thin metal strip of FIG. 6 showing the wave form corrugations.

FIGS. 5, 6, and 7 are views of a corrugated thin metal layer or strip used in the preferred embodiments of this invention. Referring to FIG. 5, there is shown in plan view a typical corrugated thin metal strip generally indicated at 90. In a specific embodiment, the corrugated thin metal strip or layer 90 is 0.002" thick and has a flattened center portion 92 usually about 1" wide, and is flattened in end portions 94 and 96 usually about 0.25" wide. The strip overall is about 10.25" long after the ends 94 and 96 and center portion 92 are flattened. The strip 90 is about 3.0" wide. The flattened ends 94 and 96 are desirably cleaned of any coating to facilitate welding or brazing. The end 94 is cleaned of coating on the top side, and the end 96 is cleaned of coating on the bottom side.

FIG. 6 shows the corrugated thin metal strip 90 of FIG. 5 in edge view, and FIG. 7 shows a portion of the corrugated surface on an enlarged scale. The amplitude and pitch of the corrugations in the embodiment shown is desirably about 0.074".

Figures 8, 9, 10:
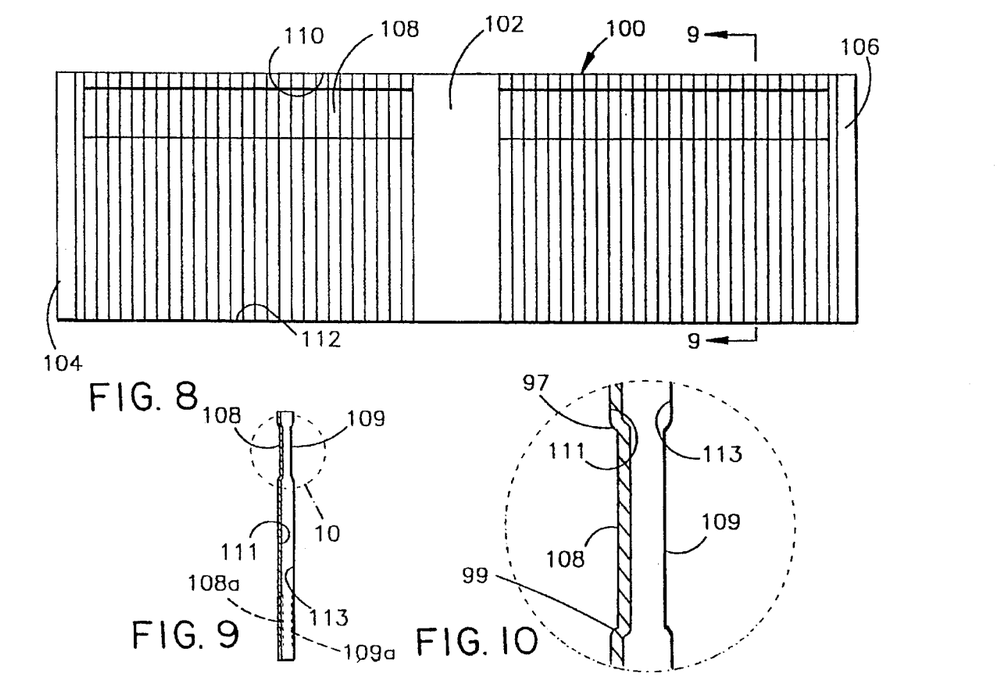
FIG. 8 is a plan view of a corrugated thin metal strip of the electrically heatable portion of the converter body hereof.
FIG. 9 is a cross-sectional view of the corrugated thin metal strip of FIG. 8 as it appears in the plane indicated by the line 9—9 in FIG. 8.
FIG. 10 is an enlarged view of a portion of the cross-sectional view of FIG. 9 showing the recesses in the corrugated thin metal strip useful in the electrically heatable portion of a converter body hereof.

FIG. 8 is a plan view of a corrugated thin metal strip in accordance herewith, generally indicated by the number 100. Like the thin metal strip 90 shown in FIG. 5, the corrugated thin metal strip 100 has a flattened center portion 102, and flattened ends 104 and 106. The ends are cleaned as above, e.g., the end 104 is cleaned of any coating on the top side, and the end 106 is cleaned of any coating on the bottom side. The corrugated thin metal strip 100 differs from the strip 90 in FIG. 5 by having recesses or channels 108 and 109 formed, as by roll forming or stamping with flat dies, in the crowns or tops 111 and 113 (FIGS. 9 and 10). The recesses 108 and 109 are wide enough in an axial direction to accept the heater band 120 shown in FIG. 11, and described below. The top marginal edge 110 of the strip 100 is the leading edge of the core member or strip 100, i.e., it is the edge of the strip 100 which first contacts the incoming pollutant-laden exhaust gas as it enters the core body 10 (FIG. 1). The bottom marginal edge 112 is the trailing edge, and is the edge of the strip 100 which last contacts the exhaust gas as it leaves the core body 10 (FIG. 1).

The recess 108, for example, is spaced from the top marginal edge 110, in a specific example a distance of about 0.2". In the specific embodiment shown in FIGS. 8, 9 and 10, the recess 108 is about 0.6" wide, and about 0.006" deep and bounded by spaced parallel lines 97 and 99. As indicated above, second recesses 108a and/or 109a about 0.6" wide and about 0.06" deep and spaced about 0.2" from the bottom marginal edge 112 may be desirably be applied for easier manufacture although it is not later used in the device. As shown in FIG. 10, the recesses 108 and 109 are conveniently in back-to-back relation.

Figure 11:
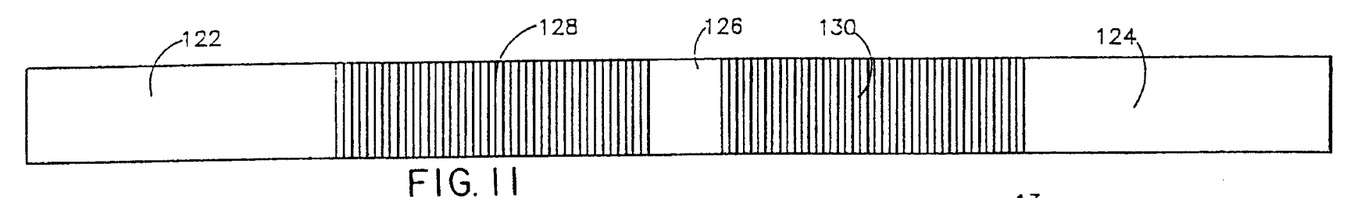
FIG. 11 is plan view of a corrugated thin metal heater band in accordance herewith.
Figure 12:
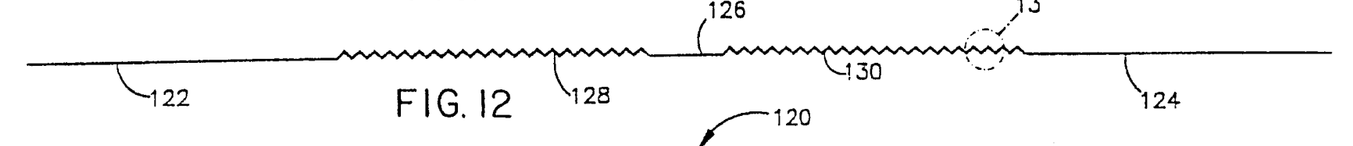
FIG. 12 is an edge view of the heater band of FIG. 11.
Figures 13, 14, 16:
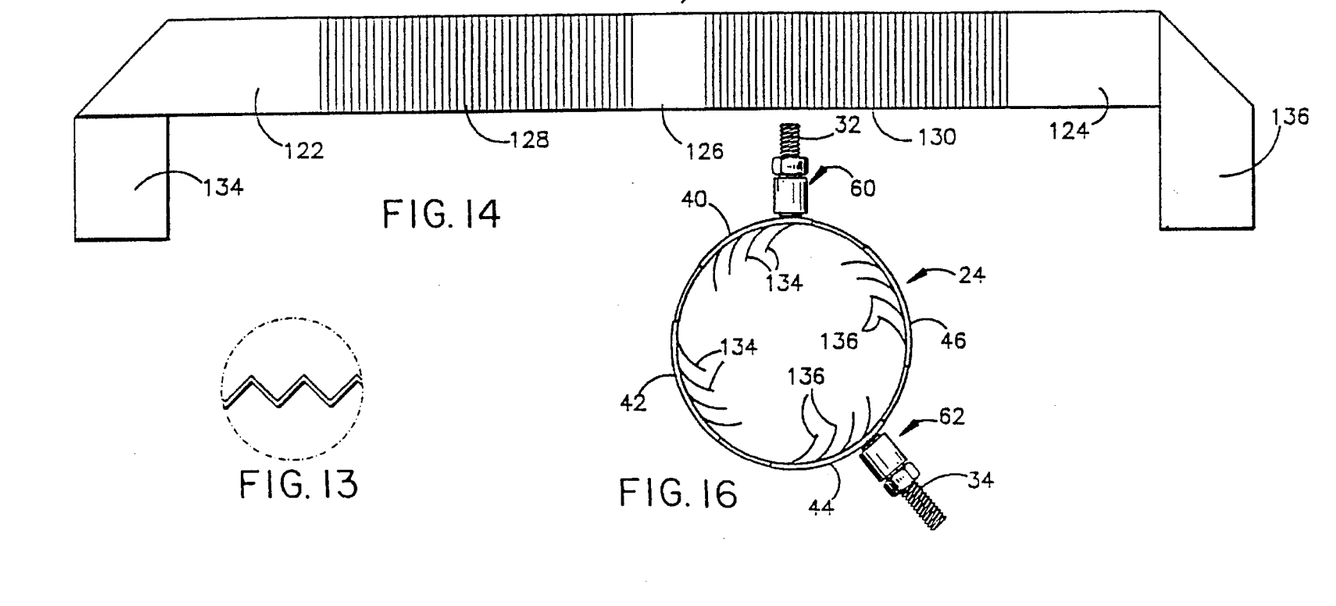
FIG. 13 is a view on an enlarged scale of the corrugations of a portion of the heater band.
FIG. 14 is a plan view of a corrugated thin metal heater band with the ends folded to be at right angles to the band.
FIG. 16 shows diagrammatically an end view of of a core with the overfolded ends of the heater bands as secured to a four-segment terminal bus and connector bus.

FIG. 11 is a top plan view of a heater band generally indicated at 120. The heater band 120 is also desirably very lightly corrugated. FIG. 12 is an edge view of the heater band 120 and FIG. 13 is an edge view of a fragment of the heater band 120 on an enlarged scale showing the corrugations. The heater band 120 in a specific example is about 13" long and 0.5" wide by 0.002" thick. The small corrugations in a specific example have an amplitude of about 0.015" and are generally nearly sinusoidally shaped in cross-section. (See FIG. 13) The band 120, which is about 0.5" wide, has its end portions 122 and 124, and its center portion 126 all flattened. In a specific example, the end portions are each flattened for a distance of 1.5" and the center portion flattened for 1.25". The corrugated portions 128 and 130 extend for about 4.4" on either side of the center portion 126. These heater bands are desirably made of Haynes 214 alloy strip 0.002" thick. The corrugated portion may be coated with a refractory metal oxide coating, e.g., gamma-alumina/ceria desirably plasma spray applied, or with a alumina/phosphate coating as described above. The preferred coating for the heater bands 120 is a refractory metal oxide coating, e.g., gamma-alumina, applied by electrophoretic deposition to a loading of from 10 mgs/sq.in. up to 35 mgs/square inch, baked at about 950 degrees C. for up to 30 to 90 minutes, e.g., 60 minutes, and then treated with liquid dilute aqueous phosphoric acid (about 23% by weight concentration) by brush or spray application, then blotting and drying with an electric dryer, followed by calcining again at about 950 degrees C. for 5 minutes. The alumina coating may be applied by any conventional method of application, e.g., washcoating, or plasma spray application, although electrophoretic deposition is preferred because this process coats the edges of the heater band. The phosphoric acid treatment is, as indicated above, the invention of William B. Retallick.

FIG. 14 shows a heater band 120 such as shown in FIG. 11 with the ends 122 and 124 folded at right angles to the band 120 to provide brazing tabs 134 and 136 at each end. In a specific example, these tabs 134 and 136 extend in the same direction a distance of about 0.75" from the main heater band 120. The flattened portions 122 and 124 are cleaned of any coating so that they may be brazed or, preferably welded to the terminal bus and retainer 24 (See FIGS. 1–4).

Figure 15:
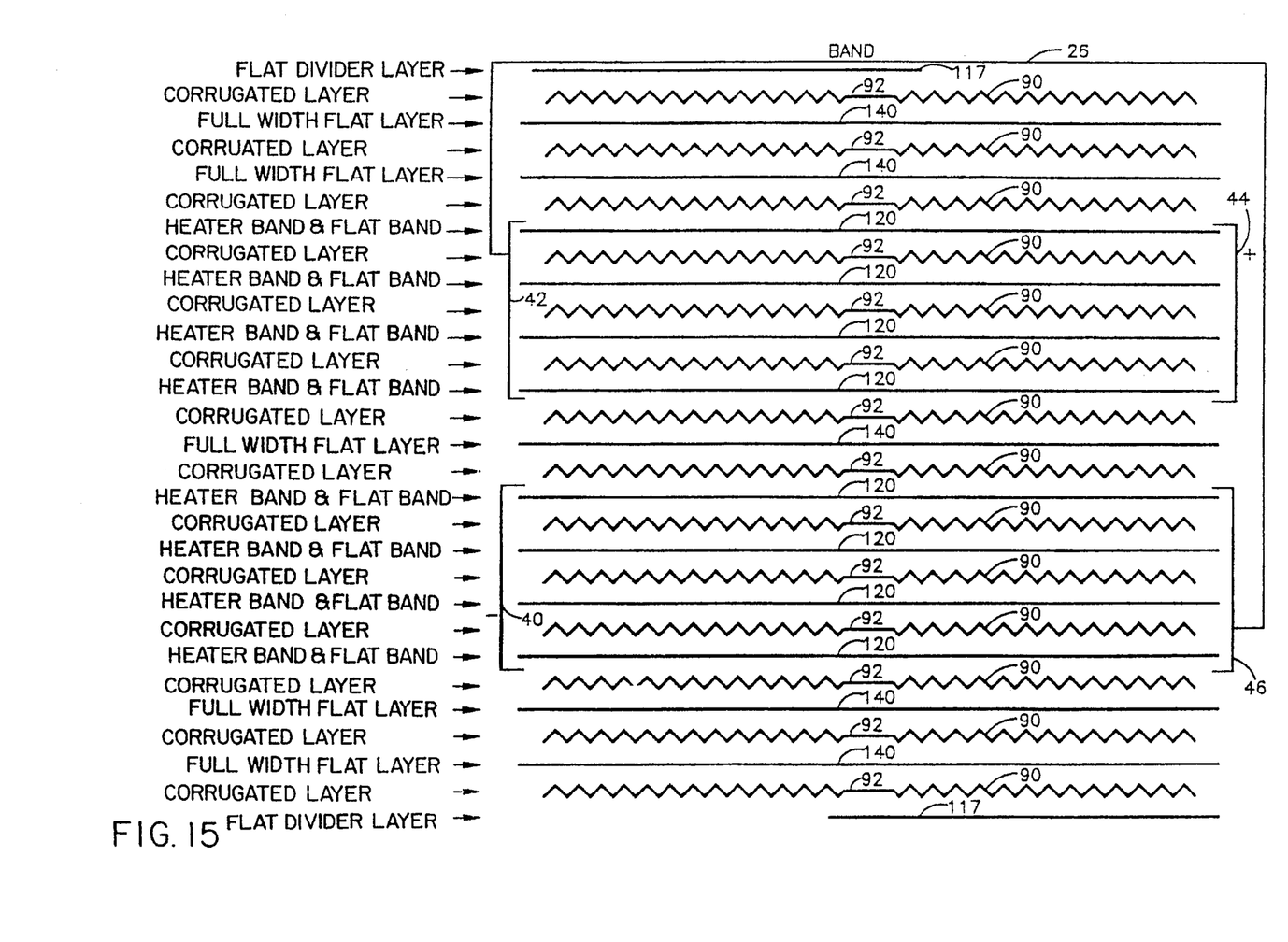
FIG. 15 is a diagrammatic illustration of a metal core honeycomb stack of thin metal strips showing two heater circuits in series.

FIG. 15 is a diagrammatic and schematic layout of the thin metal layers in a preferred converter body 10 (FIG. 1). In the illustrated stack of FIG. 15, the top and bottom layers are the divider layers 117. The divider layers 117 are described and shown in commonly owned application Ser. No. 08/282,716 filed 29 Jul. 1994. The corrugated thin metal layers 90 are shown in FIG. 5 with the flattened center portion 92. All of the corrugated thin metal layers 90 have a width approximately equal to the full axial extent of the core 10 (FIG. 1), keeping in mind that the individual layers in the rolled out condition have a length of about 11+ inches and a width of about 2.9". The core 10 is formed by grasping the stack of FIG. 15 at the center portion 92, compressing the stack, and spirally winding to form the core 10. FIG. 15 shows the stack from the gas inlet face 70 (FIGS. 2 and 3).

The first six layers are first, a flat divider strip or layer 117, and second a full width corrugated thin metal layer 90, then two full axial length flat layers 140 alternated with two full width corrugated layers 90. The next seven layers (proceeding from the top of FIG. 15 downward are four heater bands 120 (FIG. 14) and three corrugated thin metal layers 90 (FIG. 5) in alternating relation. The next three layers are two corrugated thin metal layers 90 (FIG. 5) and one full width flat thin metal layers 140 in alternating relation. The next seven layers are four heater bands 120 (FIG. 14) and three corrugated thin metal layers 90 (FIG. 5). The next five layers are three corrugated thin metal strips or layers 90 alternating with two flat thin metal layers 140. Finally, there is provided a flat thin metal divider layer 117. The final flat thin metal layer 117 is the same as the first flat thin metal divider layer 117 only turned end-for-end.

It should be pointed out that with the flat thin metal heater bands 120, only the leading edges (i.e., the edges first contacted by gas entering the converter body 10) are shown in FIG. 15. The heater bands 120 of FIG. 14 are backed up by flat thin metal bands, not shown, which fill out the axial extent of the heater band layers. Together the flat thin metal heater band 120 and the flat thin metal band with the small space between them constitute a full width or "layer", the term "band" being applied to distinguish these elements from the full width corrugated and flat thin metal layers.

The end tabs 134 of the heater bands 120 (FIG. 14) at the left hand end of the diagram in FIG. 15, in the first group of seven layers mentioned above, are brazed or welded to the terminal bus and retainer 24 at the connector bus sector 42 as shown in FIG. 4. Connector bus sector 42 is directly connected to connector bus sector 46 through the bar 26. The end tabs 136 of the heater bands 120 (FIG. 14) at the right hand end of the diagram in FIG. 15 in the first group of seven layers mentioned above are brazed or welded to the terminal bus sector 44 of the terminal bus and retainer 28. Sectors 42 and 46 are connector buses, i.e., they are not directly connected to a voltage source. Terminal bus sector 44 is directly connected to the positive pole of a battery, not shown in FIG. 15, but indicated by a "+" sign.

The next group of seven layers proceeding in a downward direction are like the first group of seven layers described above. The group consists of four thin metal heater bands 120 in alternating relation with three corrugated thin metal layers 90. The four thin metal heater band tabs 136 are brazed or welded to the connector bus sector 46 at the right hand end thereof, and the tabs 134 are, in turn, brazed or welded to the terminal bus sector 40. Terminal bus sector 40 is directly connected through the terminal 34 to the negative pole of a voltage source (not shown) as indicated by the "–" sign.

For an illustration of the flat band that backs-up the flat heater band 120, reference may be had to FIG. 6 of Brunson application Ser. No. 08/282,716 filed 29 Jul. 1994 showing flat band 100 which is a rectangle about 2" wide by 10.4" long by 0.002" thick having cleaned top and bottom ends 102 and 104.

The stack of 28 layers such as described above is compressed and grasped in the middle with a U-shaped clip 22 (FIG. 2) and tightly spirally wound in a clockwise, or counterclockwise, manner to form the core 10 in accordance herewith.

FIG. 16 is a diagrammatic illustration of the foil to bus welding or brazing pattern. The terminal 32 extends through the insulated feed-through generally indicated at 60 and is stud welded to the terminal bus sector 40 of the terminal bus and retainer 24. The tabs 134 of the heater bands 120 of the second group are spot welded to the terminal bus sector 40, as indicated, and the tabs 136 of the same heater bands 120 are spot welded to the connector bus sector 46. Likewise, the tabs 136 of the heater bands 120 of the first group are spot welded to the terminal bus sector 44 and the ends 134 of the same heater bands are spot welded to the connector bus sector 42.

In FIG. 15, there have been shown eight flat heater bands 120 and five flat strips 140. It is contemplated that the five flat strips 140 may be replaced with five heater bands 120 and suitably connected electrically, so that instead of a partially electrically heated front face 70 (FIG. 2), the entire front face 70 is electrically heated. It is also contemplated that instead of flat heater bands 120 and flat bands to back them up in an axial direction, the flat heater bands 120 and the flat back-up bands may be exchanged with corrugated thin metal heater bands and corrugated back-up bands.

Figure 17:
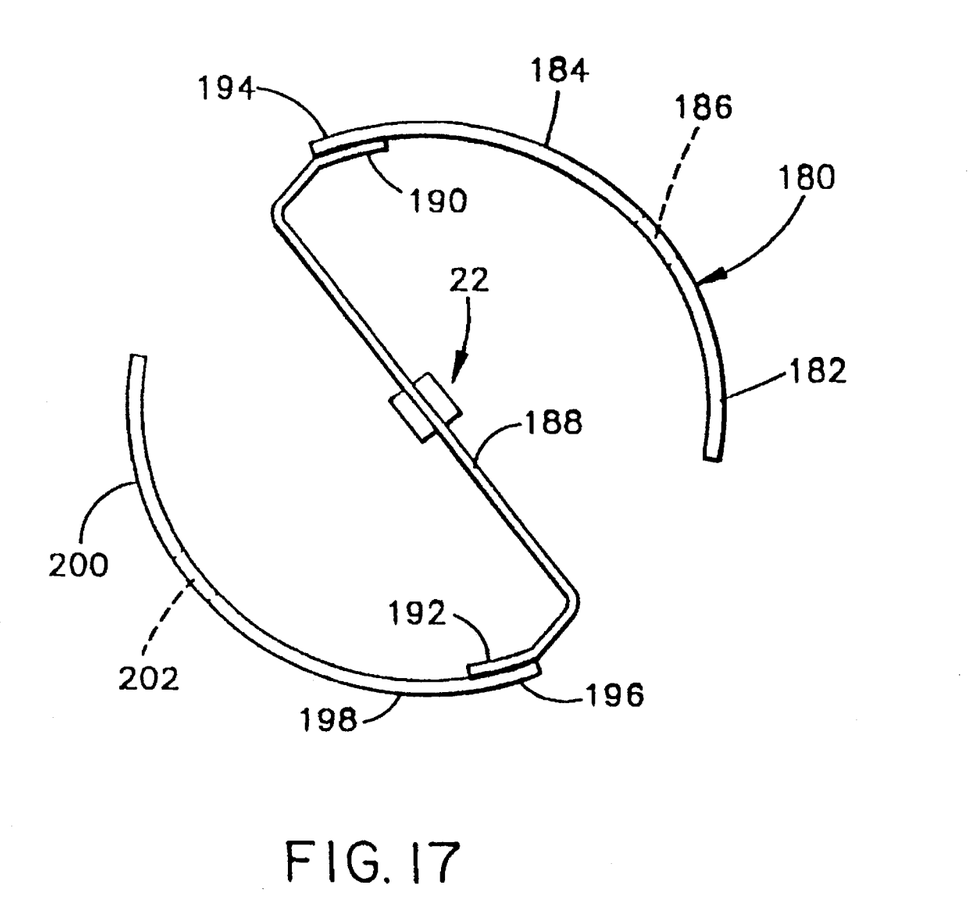
FIG. 17 is a top plan view of a preferred form of terminal bus and retainer ring for use in the structures of this invention.

FIG. 17 shows a three-piece terminal bus and retainer ring generally indicated at 180. This structure is characterized in that the cross bar 188 of generally S-shape, is welded at each end 190 and 192 to the arcuate members 194 and 196 instead of being continuous therewith as in the case of the terminal bus and retainer structure 24 shown in FIG. 1. The cross bar 188 joins two connector bus sectors 198 and 184 thereby providing electrical connection between the sectors. Connector bus sectors 198 and 184 are each connected by a narrow removable portion 202 and 186, respectively, to terminal bus sectors 200 and 182, respectively. The three-piece structure of FIG. 17 is less costly and less complex to make and use, and produces less scrap.

Numerous variations in the preferred structure above described may be used without departing from the invention. For example, although electrical connections at the outside diameter of the core have been shown, they may be made at the center of the core and at the outside diameter. While straight-through cells have been shown, patterned cells, such as those formed with herringbone or chevron shaped corrugations, may also be used. Where the latter type of corrugations are used, the flat thin metal layers may be omitted. While thin metal layers have been shown and described without tabs on the ends of the strips, as shown for example in U.S. Ser. No. 08/013,516 supra, the structure of the latter Ser. No. may be used, if desired. While a circular core body has been shown, it will be understood that any cross-sectional configuration, e.g., oval, elliptical, rectangular, or the like may be used. The electrically heatable portion, while desirably integral and intertwined with the light-off portion, may be separated or isolated from the light-off portion. Instead of solid thin metal strips as are preferred herein, perforated thin metal strips for either or both of the the flat or corrugated thin metal strips, including screen, may be substituted therefor. While it is desirable to make the devices hereof from a single stainless steel alloy or nickel/chromium alloy, it will be found desirable to in certain cases to strengthen the core body by using various reinforcing means, such as fashioning some of the thin metal strips from a stainless steel, for example, and others from a nickel/chromium alloy; or by doubling or tripling the thickness of one or more of the strips or layers. The improved recessed corrugated thin metal strips hereof, and especially in combination with the heater bands hereof may be used in any of the foregoing variations.

There has thus been provided an improved converter body core element characterized by a corrugated strip having parallel to a marginal edge thereof, a recess dimensioned and configured to receive a heater band. The heater band is desirably lightly corrugated and is dimensioned and configured to fit into said recess.

What is claimed is:

1. A corrugated thin metal strip for a converter body comprising an elongated thin metal strip having parallel marginal edges, a plurality of corrugations extending between said marginal edges, the peaks of the corrugations on one side of the strip for at least a portion of the distance between said marginal edges being deformed in a direction toward the opposite side of said thin metal strip to form a first recess having spaced parallel edges lying parallel to the marginal edges of the elongated corrugated thin metal strip, and a second recess provided in the opposite side of the elongated corrugated thin metal strip thereby forming a pair of recesses in back-to-back relation.

2. A corrugated thin metal strip as defined in claim 1 wherein said first recess is disposed closer to one marginal edge than to the other.

3. A corrugated thin metal strip as defined in claim 1 wherein the pair of recesses are each the same distance from the same marginal edge.

4. A corrugated thin metal strip as defined in claim 3 wherein each of the pair of recesses has the same width.

5. A combined corrugated thin metal strip and heater band comprising:

an elongated corrugated thin metal strip as defined in claim 1; and a metallic electrically heatable heater band disposed in said first recess of said elongated corrugated thin metal strip.

6. A combined corrugated thin metal strip as defined in claim 5 wherein the electrically heatable heater band is corrugated at an amplitude less than the amplitude of the corrugated thin metal strip and at a pitch less than the pitch of corrugated thin metal strip.

7. An electrically heatable converter body comprising (a) a multicellular metallic core honeycomb formed of thin sheet metal strips, said multicellular metallic core honeycomb having a circular, oval or elliptical cross-section, said multicellular metallic core honeycomb having at least one electrically heatable honeycomb portion and at least one honeycomb light-off portion, the thin sheet metal strips of said at least one electrically heatable honeycomb portion being intertwined and integral with the sheet metal strips of said at least one honeycomb light-off portion, said core having a gas inlet face and a gas outlet face; (b) a housing for said core; (c) at least one of the thin metal strips in said electrically heatable portion being corrugated and having parallel marginal edges and a plurality of corrugations extending between said marginal edges, the peaks of the corrugations on at least one side of the strip and for at least a portion of the distance between said marginal edges being deformed toward the opposite side of the strip to provide a first recess dimensioned and configured to receive a thin metal heater band, wherein said first recess has spaced parallel edges lying parallel to said marginal edges; and (d) an electrically heatable thin metal heater band disposed in said first recess.

8. A converter body as defined in claim 7 wherein said first recess is disposed closer to one marginal edge of the strip than to the other.

9. A converter body as defined in claim 7 wherein a second recess is provided in the opposite side of said at least one of corrugated thin metal strips whereby said first and second recesses form a pair of recesses in back-to-back relation.

10. A converter body as defined in claim 9 wherein the pair of recesses are the same distance from the same marginal edge.

11. A converter body as defined in claim 10 wherein each of the pair of recesses has the same width.

12. A converter body as defined in claim 7 wherein the electrically heatable heater band is corrugated at an amplitude less than the amplitude of the corrugated thin metal strip.

* * * * *